US012691701B2

(12) United States Patent
Berthe et al.

(10) Patent No.: US 12,691,701 B2
(45) Date of Patent: Jul. 28, 2026

(54) PERSONALISED IMAGE FORMED FROM A METAL LAYER AND A LENTICULAR ARRAY

(71) Applicant: IDEMIA FRANCE, Courbevoie (FR)

(72) Inventors: Benoît Berthe, Courbevoie (FR); Alban Remy, Courbevoie (FR); Paul Azuelos, Courbevoie (FR)

(73) Assignee: IDEMIA IDENTITY & SECURITY FRANCE, Courbevoie (FR)

(*) Notice: Subject to any disclaimer, the term of this patent is extended or adjusted under 35 U.S.C. 154(b) by 691 days.

(21) Appl. No.: 18/253,794

(22) PCT Filed: Nov. 23, 2021

(86) PCT No.: PCT/FR2021/052075
§ 371 (c)(1),
(2) Date: May 22, 2023

(87) PCT Pub. No.: WO2022/112708
PCT Pub. Date: Jun. 2, 2022

(65) Prior Publication Data
US 2024/0017563 A1 Jan. 18, 2024

(30) Foreign Application Priority Data
Nov. 30, 2020 (FR) ..................................... 20 12409

(51) Int. Cl.
*B42D 25/435* (2014.01)
*B42D 25/29* (2014.01)
(Continued)

(52) U.S. Cl.
CPC ......... *B42D 25/328* (2014.10); *B42D 25/324* (2014.10); *B42D 25/346* (2014.10);
(Continued)

(58) Field of Classification Search
CPC ....... B42D 25/373; B41M 3/14; B41M 3/148; G09F 2003/0277; G09F 3/0341
See application file for complete search history.

(56) References Cited

U.S. PATENT DOCUMENTS 8,062,735 B2 * 11/2011 Bi ........................ B42D 25/364 428/323
9,342,049 B2 * 5/2016 Brown ................... B42D 25/29
(Continued)

FOREIGN PATENT DOCUMENTS

DE 10 2012 007 747 A1 10/2013
DE 10 2012 211 767 A1 1/2014
WO WO 2020/174153 A1 9/2020

OTHER PUBLICATIONS

International Search Report issued Mar. 10, 2022 in PCT/FR2021/052075 filed on Nov. 23, 2021, 2 pages.
(Continued)

*Primary Examiner* — Shin H Kim
(74) *Attorney, Agent, or Firm* — Oblon, McClelland, Maier & Neustadt, L.L.P.

(57) ABSTRACT

A security document including a metal layer comprising an arrangement of diffractive nanostructures arranged periodically in the metal layer to form a diffractive holographic structure forming an arrangement of pixels each comprising a plurality of sub-pixels of distinct colors, a lenticular array comprising convergent lenses positioned facing the metal layer, and a support layer on which the metal layer is disposed so that the metal layer is sandwiched between the lenticular array and the support layer. The metal layer includes perforations formed by focusing laser radiation through the lenticular array on the metal layer, the perforations including at least one group of perforations produced by focusing the laser radiation at a respective angle of incidence to reveal a corresponding personalized image
(Continued)

when the security document is observed at this angle of incidence.

20 Claims, 10 Drawing Sheets

(51) Int. Cl.

| | |
|---|---|
| ***B42D 25/324*** | (2014.01) |
| ***B42D 25/328*** | (2014.01) |
| ***B42D 25/346*** | (2014.01) |
| ***B42D 25/373*** | (2014.01) |
| ***B42D 25/387*** | (2014.01) |

(52) U.S. Cl.
CPC ......... *B42D 25/373* (2014.10); *B42D 25/387* (2014.10); *B42D 25/435* (2014.10)

(56) References Cited

U.S. PATENT DOCUMENTS

| | | | | |
|---|---|---|---|---|
| 9,460,665 | B2 * | 10/2016 | Jiang | G09G 3/3413 |
| 9,770,935 | B2 * | 9/2017 | Souparis | B42D 25/29 |
| 11,040,565 | B2 * | 6/2021 | Rauch | B42D 25/435 |
| 12,233,659 | B2 * | 2/2025 | Duriez | B42D 25/324 |
| 2010/0097545 | A1 * | 4/2010 | Robinson | H04N 13/305 349/95 |
| 2011/0298205 | A1 * | 12/2011 | Pohjola | B42D 25/41 29/428 |
| 2012/0038140 | A1 * | 2/2012 | Dhome | B42D 25/24 283/67 |
| 2014/0028012 | A1 * | 1/2014 | Petiton | G02B 5/1809 283/85 |
| 2015/0042702 | A1 * | 2/2015 | Jiang | G02B 1/005 345/694 |
| 2018/0361777 | A1 * | 12/2018 | Fuhse | B42D 25/435 |
| 2019/0210398 | A1 * | 7/2019 | Peters | B41M 3/148 |
| 2020/0215846 | A1 * | 7/2020 | Ordung | B42D 25/378 |
| 2023/0024208 | A1 * | 1/2023 | Duriez | B42D 25/328 |
| 2024/0100875 | A1 * | 3/2024 | Berthe | B42D 25/346 |
| 2024/0208259 | A1 * | 6/2024 | Vandroux | B42D 25/41 |

OTHER PUBLICATIONS

Preliminary Search Report and Written Opinion issued Aug. 25, 2021 in French Application 20 12409 filed on Nov. 30, 2020, 10 pages.

* cited by examiner

PERSONALISED IMAGE FORMED FROM A METAL LAYER AND A LENTICULAR ARRAY

TECHNICAL FIELD

The invention relates to a technique for forming grayscale or color images, and relates more particularly to a document comprising a lenticular array and a laser-perforated metal layer, an image being formed from the combination of the metal layer and the laser perforations.

PRIOR ART

The identity market nowadays requires identity documents (also called identification documents) to be increasingly secure. These documents must be easily authenticatable and difficult to counterfeit (if possible unforgeable). This market relates to highly diverse documents, such as identity cards, passports, access badges, driving licenses, etc., which may take various formats (cards, booklets, etc.).

Various types of secure documents comprising images have thus been developed over time, especially with a view to securely identifying people. Passports, identity cards and various other official documents nowadays generally comprise security elements that allow the document to be authenticated and the risks of fraud, falsification or counterfeiting to be limited. Electronic identity documents comprising a chip card, such as electronic passports for example, have thus seen a substantial increase in popularity over the last few years.

Various printing techniques have been developed over the course of time to produce color prints. Production in particular of identity documents such as those mentioned above requires images to be produced securely in order to limit the risks of falsification by malicious individuals. The manufacture of such documents, in particular as regards the image used to identify the holder, needs to be complex enough to make reproduction or falsification by an unauthorized individual difficult.

One known solution thus consists in printing, on a support, a matrix of pixels formed of color sub-pixels and in forming grayscale levels by laser carbonization in a laserable layer located facing the matrix of pixels, so as to reveal a personalized color image that is difficult to falsify or to reproduce. Some exemplary embodiments of this technique are described for example in documents EP 2 580 065 B1 (dated Aug. 6, 2014) and EP 2 681 053 B1 (dated Apr. 8, 2015).

Although this known technique offers good results, some improvements are still possible in terms in particular of the quality of the visual rendering of the image thus formed. Based on this image-forming technique, it is indeed difficult to achieve high levels of color saturation. In other words, the color gamut (ability to reproduce a range of colors) of this known technique may prove to be limited, which may pose a problem in some use cases. This is due in particular to the fact that the color sub-pixels are formed by a conventional printing method, by "offset" printing for example, which does not make it possible to form sufficiently rectilinear and continuous rows of sub-pixels, thereby leading to homogeneity defects when printing the sub-pixels (interruptions in the rows of pixels, irregular contours, etc.) and degraded colorimetric rendering.

Current printing techniques also offer limited positioning accuracy due to the inaccuracy of printing machines, thereby also reducing the quality of the final image owing to incorrect positioning of the pixels and sub-pixels with respect to one another (problems with overlapping sub-pixels, misalignments, etc.) or owing to the presence of a non-printed tolerance interval between the sub-pixels.

There is nowadays a need to securely form good-quality personalized (color or grayscale) images, in particular in documents such as identity documents, official documents or the like. There is a need in particular to allow flexible and secure personalization of color or grayscale images, such that the image thus produced is of good quality, difficult to falsify or to reproduce and may be easily authenticated.

There is also a need for a solution that makes it possible to produce secure images having a good luminosity level and a large color gamut, in particular in order to obtain the color shades needed to form certain high-quality color images, for example when some image areas should have a highly saturated level in a given color.

SUMMARY OF THE INVENTION

In view in particular of the abovementioned problems and shortcomings, one technique consists in forming a personalized image by arranging a holographic structure, forming an arrangement of color pixels, facing an opaque layer.

FIG. 1 thus shows a manufacturing technique that makes it possible to form a secure (color or grayscale) image 100 having a good image quality and that is difficult to falsify or to reproduce. To this end, a holographic layer 114 is positioned facing a second layer 116 that is opaque with respect to at least the visible wavelength spectrum. The holographic layer 114 comprises a metal holographic structure 146 forming an arrangement 130 of pixels 132 visible to an observer OB. These pixels 132 each comprise a plurality of sub-pixels 134 of different colors.

As illustrated in FIG. 1, the holographic layer 114 comprises perforations 120 formed by laser radiation LS1. These through-perforations locally reveal, through the holographic structure 146, dark areas 142 in the sub-pixels 134, these dark areas 142 being formed by underlying regions 141 of the opaque layer 116 that are located facing the perforations 120, so as to form a personalized image IG from the arrangement 130 of pixels in combination with the dark areas 142.

This technique makes it possible in particular to form a personalized image that is secure and of good quality, without having to use powerful laser radiation that is liable to generate air bubbles through heating in the holographic structure 146, which would lead to irreversible destruction of the holographic structure.

However, this technique requires forming a large number of perforations in the holographic layer 114, in particular when it is desired to create significant contrasts in the final image IG. Now, it has been observed that large numbers or concentrations of perforations may undesirably degrade the physical integrity of the holographic layer 114 in certain regions, thereby possibly leading to losses of adhesion of the holographic layer with respect to its support. The applicant has thus observed the formation of delaminations when the holographic layer no longer adheres sufficiently to its support owing to the excessive density of the perforations passing through it.

There is therefore a need to rectify the additional problems and deficiencies indicated above. The present invention aims in particular to enable the formation of personalized images that are both secure and of good quality, while at the same time avoiding the problem of loss of adhesion explained above.

To this end, the present invention relates to a secure document comprising:

a metal layer comprising a diffractive arrangement of nanostructures;

a lenticular array comprising converging lenses positioned facing the metal layer; and a support layer on which the metal layer is arranged such that said metal layer is interposed between the lenticular array and the support layer;

wherein the metal layer comprises perforations formed by focusing laser radiation through the lenticular array onto the metal layer, the perforations comprising at least one group of perforations produced by focusing the laser radiation at a respective angle of incidence so as to reveal a corresponding personalized image when the secure document is observed at said angle of incidence.

The invention makes it possible to create color or grayscale shades in a metal layer comprising a diffractive arrangement of nanostructures, so as to reveal at least one secure image. The lenticular array of the invention makes it possible to focus the laser radiation onto small portions of the metal layer during the phase of personalizing the one or more images, so as to guarantee good adhesion of the metal layer to the support layer and thus to avoid delamination problems. The invention furthermore makes it possible to store, in an image, a larger amount of information than when using a conventional image-forming technique.

According to one particular embodiment, the lenticular array comprises a plurality of cylindrical converging lenses extending in parallel in a first direction.

According to one particular embodiment, the nanostructures in the metal layer are arranged periodically so as to form a diffractive holographic structure.

According to one particular embodiment, the nanostructures in the metal layer (14) are arranged aperiodically so as to control (or modify) the colorimetry of the reflected light as a function of the angle of incidence on the metal layer.

According to one particular embodiment, the metal layer comprises a holographic structure forming an arrangement of pixels each comprising a plurality of sub-pixels of different colors, the perforations locally revealing, through the holographic structure, color or grayscale shades caused by underlying regions of the support layer that are located facing the perforations, the underlying regions modifying the colorimetric contribution of the sub-pixels.

According to one particular embodiment, each pixel of said arrangement of pixels is configured such that each sub-pixel has a unique color in said pixel.

According to one particular embodiment, the support layer is opaque with respect to at least the visible wavelength spectrum, wherein the perforations locally reveal, through the holographic structure, dark areas in the sub-pixels caused by underlying regions of the support layer that are located facing the perforations, so as to form a personalized image from the arrangement of pixels in combination with the dark areas.

According to one particular embodiment, the support layer comprises an ink sensitive to ultraviolet (UV), such that the image is visible when the secure document is exposed to ultraviolet (to UV light).

According to one particular embodiment, the support layer is transparent with respect to at least the visible wavelength spectrum, wherein the perforations locally reveal, through the holographic structure, bright areas in the sub-pixels when incident light in the visible spectrum is projected through the perforations, so as to form a personalized image from the arrangement of pixels in combination with the bright areas.

According to one particular embodiment, the lenticular array comprises a plurality of cylindrical converging lenses extending in parallel in a first direction, wherein the arrangement of pixels comprises rows of sub-pixels of the same color extending perpendicular to the first direction of the converging cylindrical lenses.

According to one particular embodiment, the lenticular array comprises a plurality of semi-spherical or aspherical converging lenses. Implementing for example aspherical lenses makes it possible in particular to compensate for optical aberrations.

According to one particular embodiment, the perforations comprise a plurality of groups of perforations, each group of perforations being produced by focusing the laser radiation at a different angle of incidence so as to reveal interleaved personalized images that are observable at the various angles of incidence.

According to one particular embodiment, the metal layer is positioned approximately in the focal plane of the lenticular array.

The invention also targets a corresponding manufacturing method. The present invention thus also targets a manufacturing method for manufacturing a document as defined in the present disclosure. In particular, the invention provides a method for manufacturing a secure document, comprising:

forming a metal layer on a support layer;

positioning a lenticular layer, comprising converging lenses, facing the metal layer, the metal layer being interposed between the lenticular array and the support layer; and forming perforations by focusing laser radiation through the lenticular array onto the metal layer, the perforations comprising at least one group of perforations produced by focusing the laser radiation at a respective angle of incidence so as to reveal a corresponding personalized image when the secure document is observed at said angle of incidence.

It should be noted that the various embodiments mentioned above (and those described below) in relation to the secure document of the invention and the associated advantages apply analogously to the manufacturing method of the invention.

BRIEF DESCRIPTION OF THE DRAWINGS

Other features and advantages of the present invention will become apparent from the description given below, with reference to the appended drawings, which illustrate exemplary embodiments thereof that are completely non-limiting in nature. In the figures.

DESCRIPTION OF EMBODIMENTS

Figure 1:
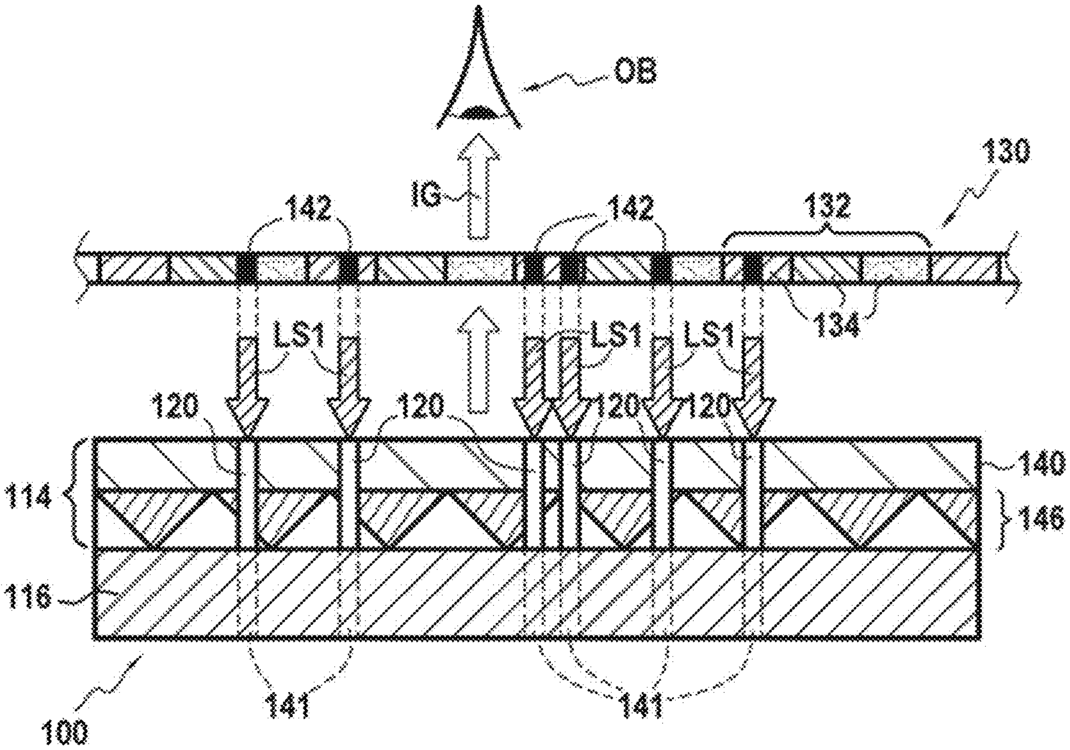
FIG. 1 is a sectional view of a multilayer structure according to one particular implementation.

As indicated above, the invention relates in general to the formation of a (color or grayscale) image, and relates in particular to a secure document comprising such an image.

In the present disclosure, the concept of grayscale refers to shades of gray that are generated in order to personalize a grayscale image. The grayscale of an area of an image defines a value between white and black. In general, the invention may be applied both to form a grayscale image and to form a color image. In the present disclosure, the concepts of "grayscale" and "colors" may replace one another indiscriminately, depending on whether it is desired to form a grayscale or color image. The concept of the invention may thus be applied to form both color images and grayscale images.

The invention proposes to form a personalized image in a secure manner from a metal layer and a lenticular array positioned facing the metal layer. The metal layer comprises an arrangement of diffractive nanostructures for diffracting light (at least) in the visible range. The metal layer furthermore comprises perforations (or holes) formed by focusing laser radiation through the lenticular array onto the metal layer. To this end, the lenticular array comprises converging lenses able to make the abovementioned laser radiation converge on the metal layer.

These perforations make it possible to reveal one or more personalized—color or grayscale—images when the document is observed at one or more appropriate observation angles. Thus, when observing the document at an angle of incidence of the laser radiation used to form perforations in the metal layer, it is possible to view an image revealed by said perforations in the metal layer.

As explained below, it is thus possible to form at least one personalized color or grayscale image that is of good quality (in particular with good contrast), easy to authenticate, robust with respect to risks of fraud, falsification or counterfeiting, while at the same time avoiding the formation of delaminations between the metal layer and its support owing to the loss of adhesion phenomenon already described above.

The invention also relates to a method for forming such a personalized image.

Other aspects and advantages of the present invention will become apparent from the exemplary embodiments described below with reference to the drawings mentioned above.

In the rest of this disclosure, exemplary implementations of the invention are described in the case of a document comprising at least one personalized image according to the principle of the invention. This document may be any document, called a secure document, such as a booklet, card or the like. The invention is particularly applicable in the formation of identity images in identity documents such as: identity cards, credit cards, passports, driving licenses, secure entry badges, etc. The invention is also applicable to security documents (banknotes, notarized documents, official certificates, etc.) comprising at least one personalized image. Other implementations are however possible.

Likewise, the exemplary embodiments described below aim to form an identity image. However, it will be understood that the personalized image formed according to the concept of the invention may be arbitrary (shape, nature, colors, etc.). It may for example be an image depicting the portrait of the holder of the document in question, other implementations however being possible.

Unless otherwise indicated, elements common to a plurality of figures or analogous elements in a plurality of figures have been designated with the same reference signs and have identical or analogous characteristics, and hence these common elements have generally not been described more than once for the sake of simplicity.

Figure 2:
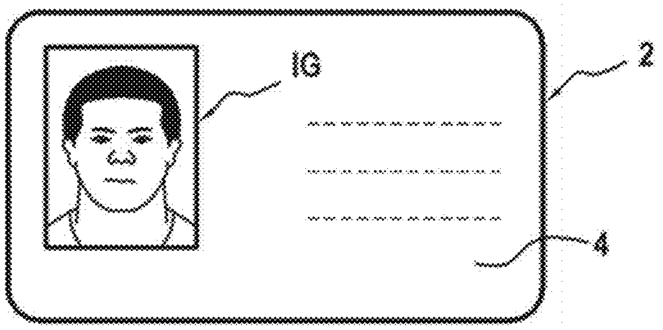
FIG. 2 schematically shows a secure document according to one particular embodiment of the invention.

As already indicated, the document within the meaning of the invention may be any document. FIG. 2 shows, according to one particular embodiment, a secure document 2 comprising a document body 4 in or on which there is formed at least one secure image IG according to the concept of the invention.

It is assumed in the following exemplary embodiments that the secure document 20 is an identity document, for example in the form of a card, such as an identity card, identification badge or the like. In these examples, the one or more images IG are grayscale or color images, the design of which corresponds to the portrait of the holder of the document. As already indicated, other examples are however possible. If multiple images IG are produced, these may be viewed by varying the observation angle with respect to the secure document 2.

Figure 3:
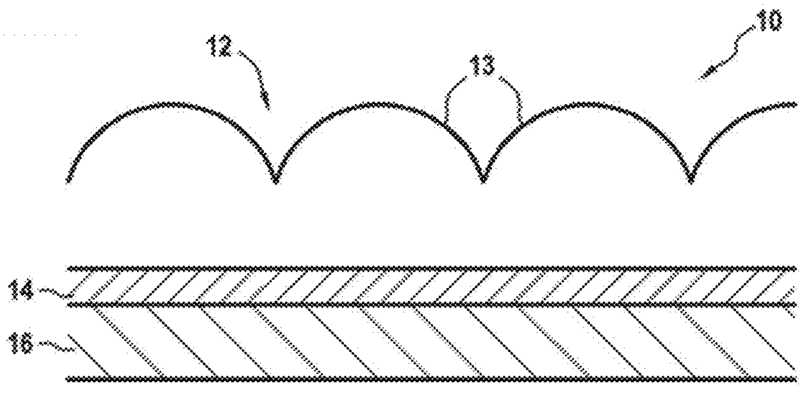
FIGS. 3 and 4 are sectional views schematically showing a multilayer structure according to one particular embodiment of the invention.

FIG. 3 shows a multilayer structure 10 in an initial (blank) state, from which it is possible to form at least one personalized color image IG, as shown in FIG. 2. As explained below with reference to FIG. 4, this structure 10 may be personalized so as to form at least one personalized image IG. This structure 10 constitutes for example the document 2 shown in FIG. 2 or may be contained within the document 2 so as to form the one or more images IG.

As illustrated in FIG. 3, the multilayer structure 10 comprises a lenticular array 12 positioned facing (above) a metal layer 14. The metal layer 14 is itself arranged on a support layer (or substrate) 16 such that this metal layer 14 is interposed between the lenticular array 12 and the support layer 16.

The metal layer 14 comprises an arrangement of diffractive nanostructures (also more simply called "nanostructures"). Various types (shapes, sizes, etc.) of diffractive nanostructures may be envisaged within the scope of the invention (arrangement of nanowires for example). In general, the diffractive nanostructures present in the metal layer 14 are configured to diffract light in the visible wavelength spectrum. The size of the diffractive nanostructures is therefore chosen accordingly: the size of the diffractive nanostructures is typically of the order of, or less than, the wavelength spectrum in the visible range. These diffractive nanostructures may be arranged periodically so as to form a diffractive holographic structure (as described below). In this case, the period is for example of the order of the wavelength of light in the visible (for example 300 nm). As a variant, the arrangement of the diffractive nanostructures may be aperiodic (non-periodic or arbitrary), thereby making it possible in particular to control (or modify) the colorimetry of the reflected light as a function of the angle of incidence of the light on the metal layer 14. The colorimetry of the reflected light is then dependent of the combination of light-matter interaction phenomena (diffraction, diffusion, absorption, etc.) occurring at the arrangement of the diffractive nanostructures.

The lenticular array 12 comprises converging lenses (or microlenses) 13 positioned facing (above) the metal layer 14. Various arrangements and configurations of lenses 13 may be envisaged, as described below. These lenses make it possible in particular to focus laser radiation onto the metal layer 14 so as to form one or more images IG according to the principle of the invention.

As described below, the support layer 16 may be opaque (non-reflective) or transparent, depending on the embodiment under consideration.

As already indicated, the metal layer 14 shown in FIG. 3 is blank in the sense that it does not comprise the information defining the design of the one or more final images IG that it is desired to form. In its initial state, the multilayer structure 10 does not form any personalized image IG. To form a personalized image IG, perforations are formed by laser radiation in the metal layer 14, as described below.

Figure 4:
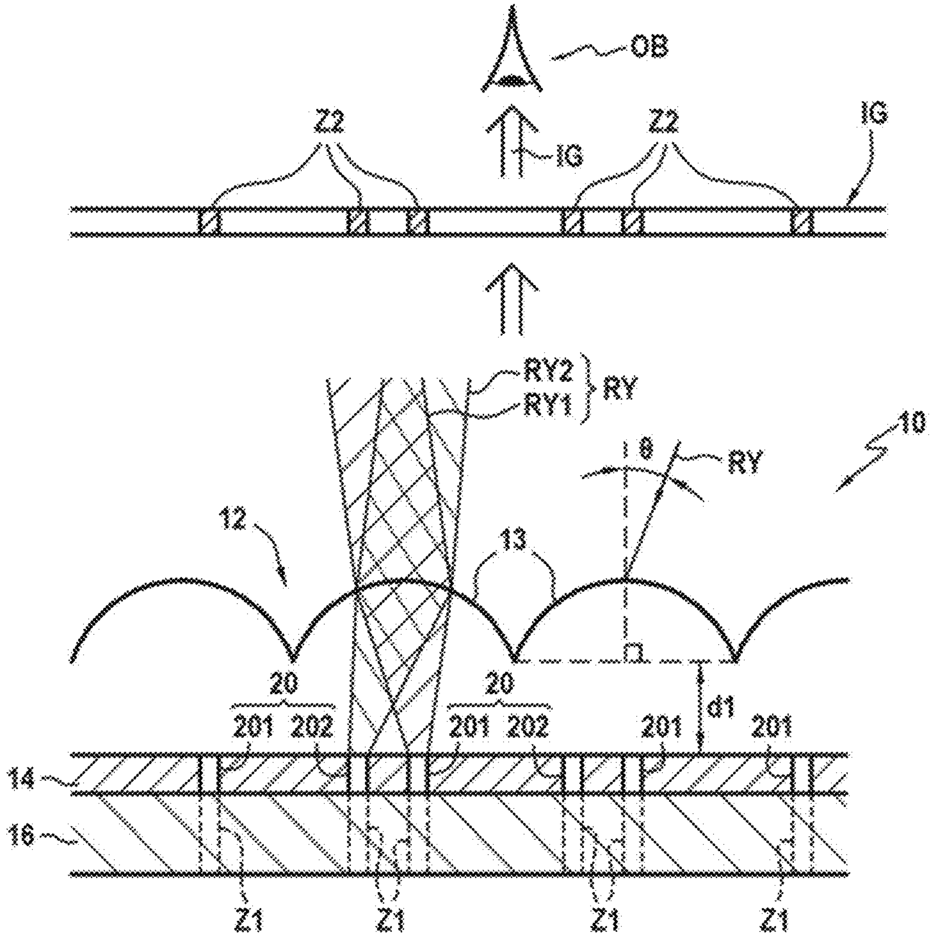

More specifically, as shown in FIG. 4, the metal layer 14 of the multilayer structure 10 comprises perforations (or holes) 20 formed by laser radiation RY (by laser engraving). These perforations 20 pass through the thickness of the metal layer 14 so as to reveal (or uncover), in a personalized image IG, through the metal layer 14, areas Z2 formed (or caused) by underlying regions Z1 of the support layer 16 that are located facing the perforations 20. These areas Z2 are areas of colorimetric shade revealed in the image IG. These areas Z2 may for example be dark if the underlying regions Z1 of the support layer 16 are opaque (with respect to at least the visible wavelength spectrum) or may be bright if the underlying regions Z1 of the support layer 16 are transparent (with respect to at least the visible wavelength spectrum). By uncovering these regions Z1 by way of the perforations 20, it is thus possible to create color shades or grayscale shades so as to personalize a final image IG. In other words, the underlying regions Z1 modify the colorimetric contribution of corresponding areas of the metal layer 14 so as to form the final image IG. This image IG may be viewed by an observer OB by observing the multilayer structure 10 either in reflection (case of the opaque support layer 16), or in light transmitted from the back face of the structure 10 (case of the transparent support layer 16).

As shown in FIG. 4, it is possible to adjust the angle of incidence θ at which the laser radiation RY is projected through the converging lenses 13 in order to adapt the position at which the radiation RY is focused onto the metal layer 14. It is thus possible to precisely control the position at which the perforations 20 are produced in the metal layer 14. In general, the metal layer 14 comprises at least one group of perforations 20 produced by focusing the laser radiation RY at a respective angle of incidence θ so as to reveal a corresponding personalized image IG when the structure 10 (or the secure document 2) is observed at said angle of incidence θ.

As a variant, the metal layer 14 may comprise a plurality of groups of perforations 20. For each of these groups, the perforations 20 are then produced by way of laser radiation RY projected at one and the same respective angle of incidence θ. Laser radiation is thus projected at different angles of incidence onto the multilayer structure 10 so as to form a plurality of images IG able to be viewed by an observer OB through the lenses 13 by adjusting the observation angle.

FIG. 4 thus shows one particular example in which first laser radiation RY1 is focused at a normal incidence onto the multilayer structure 10 (angle of incidence $\theta 1=0°$) so as to form a first group of perforations 201 in the metal layer 14, and in which second laser radiation RY2 is focused at an oblique incidence onto the multilayer structure 10 (angle of incidence $0°<\theta 2<90°$) so as to form a second group of perforations 202 in the metal layer 14. The first group of perforations 201 and the second group of perforations 202 thus form two different personalized images IG able to be viewed by an observer OB by observing the multilayer structure 10 at an observation angle equal to θ1 and θ2, respectively.

It will be considered hereinafter that the multilayer structure 10 comprises for example two different personalized images IG able to be viewed at two different observation angles. The number and the configuration of the images IG formed in the multilayer structure 10 may however be adapted depending on the use case. As a variant, the multilayer structure 10 may be personalized so as to comprise only a single image IG.

Moreover, the laser radiation RY used to form the perforations (or holes) 20 in the metal layer 14 (FIG. 4) is preferably in a wavelength spectrum different from the visible wavelength spectrum. To this end, it is possible for example to use a YAG laser (for example at a wavelength of 1064 nm), a blue laser, a UV laser, etc. Moreover, it is possible to apply for example a pulse frequency between 1 kHz and 500 kHz, although other configurations may be envisaged. It is up to a person skilled in the art to choose the configuration of the laser radiation LY according to the particular circumstances.

The metal layer 14 is designed such that it at least partially absorbs the energy delivered by the laser radiation RY so as to create the perforations 20 described above. In other words, the laser radiation RY is characterized by a wavelength spectrum that is at least partially absorbed by the metal layer 14. The materials of the metal layer 14 are therefore chosen accordingly.

According to one particular example, the materials forming the metal layer 14 are selected such that they do not absorb light in the visible. In this way, it is possible to create perforations by way of laser radiation emitting outside the visible spectrum and to generate one or more personalized images IG that are visible to the human eye by a diffractive effect.

As illustrated in FIG. 4, the metal layer 14 may be arranged at a distance d1 from the lenticular array 12. According to one particular example, this distance d1 is chosen such that the metal layer 14 is positioned in (or approximately in) the focal plane of the lenticular array 12.

This configuration makes it possible to focus the laser radiation RY as much as possible during the personalization phase and thus to limit as much as possible the proportion of the metal layer 14 that is perforated, so as to ensure the best possible adhesion of said metal layer 14 to the underlying support layer 16.

According to one particular embodiment, the support layer 16 is reactive with respect to at least the ultraviolet (UV) wavelength spectrum, for example by virtue of printing a fluorescent ink reactive to UV on the support layer 16. In this case, the perforations 20 locally reveal, through the arrangement of diffractive nanostructures, fluorescent areas Z2 caused by underlying regions Z1 of the support layer 16 that are located facing the perforations 20, so as to form a personalized image IG from the fluorescent areas Z2 when the multilayer structure (and more particularly the support layer 16) is exposed to UV radiation.

Figure 5:
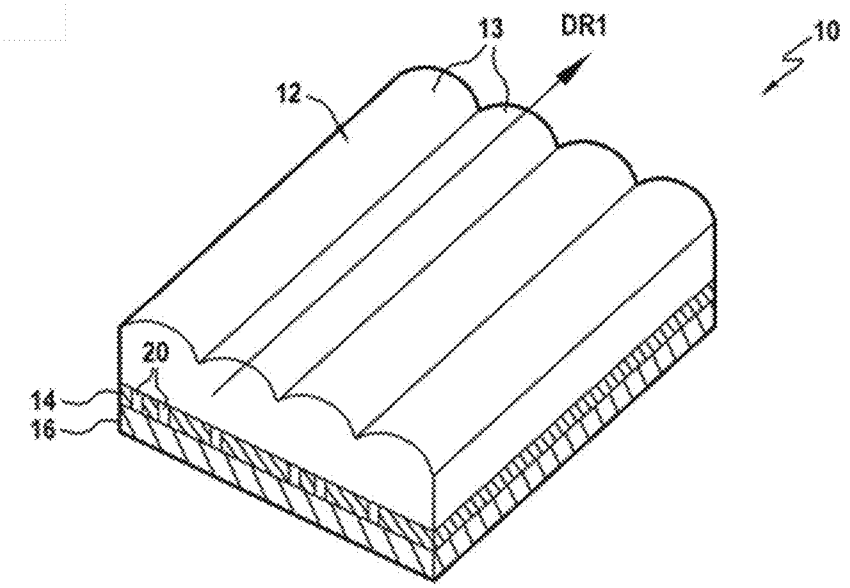
FIG. 5 is a perspective view schematically showing a multilayer structure according to one particular embodiment of the invention.
Figure 6:
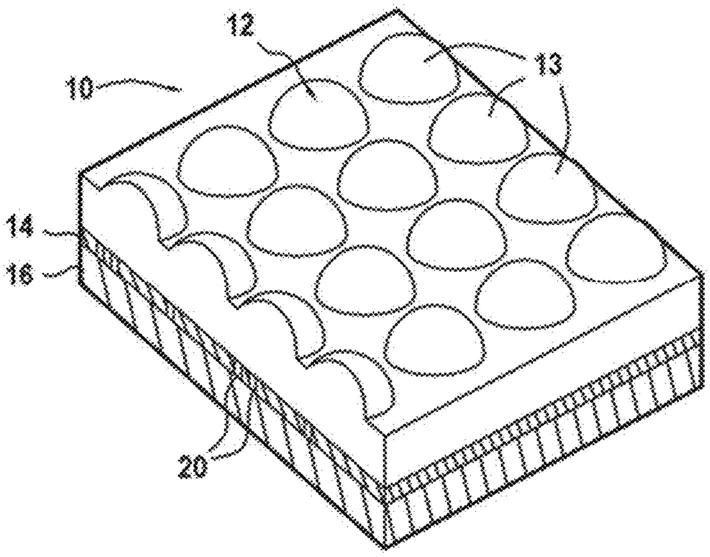
FIG. 6 is a perspective view schematically showing a multilayer structure according to one particular embodiment of the invention.

Moreover, as shown in FIG. 5, consideration will be given in the remainder of the present disclosure to the particular case in which the converging lenses 13 are cylindrical lenses that extend in parallel along a first direction DR1. It should however be noted that other implementations are possible. FIG. 6 shows for example one variant in which the converging lenses 13 are semi-spherical, or even aspherical (thereby making it possible to compensate for optical aberrations).

With reference to FIGS. 7-9 and 10A-10B, a description is given of one particular embodiment of the multilayer structure 10 shown in FIGS. 3-6.

Figure 7:
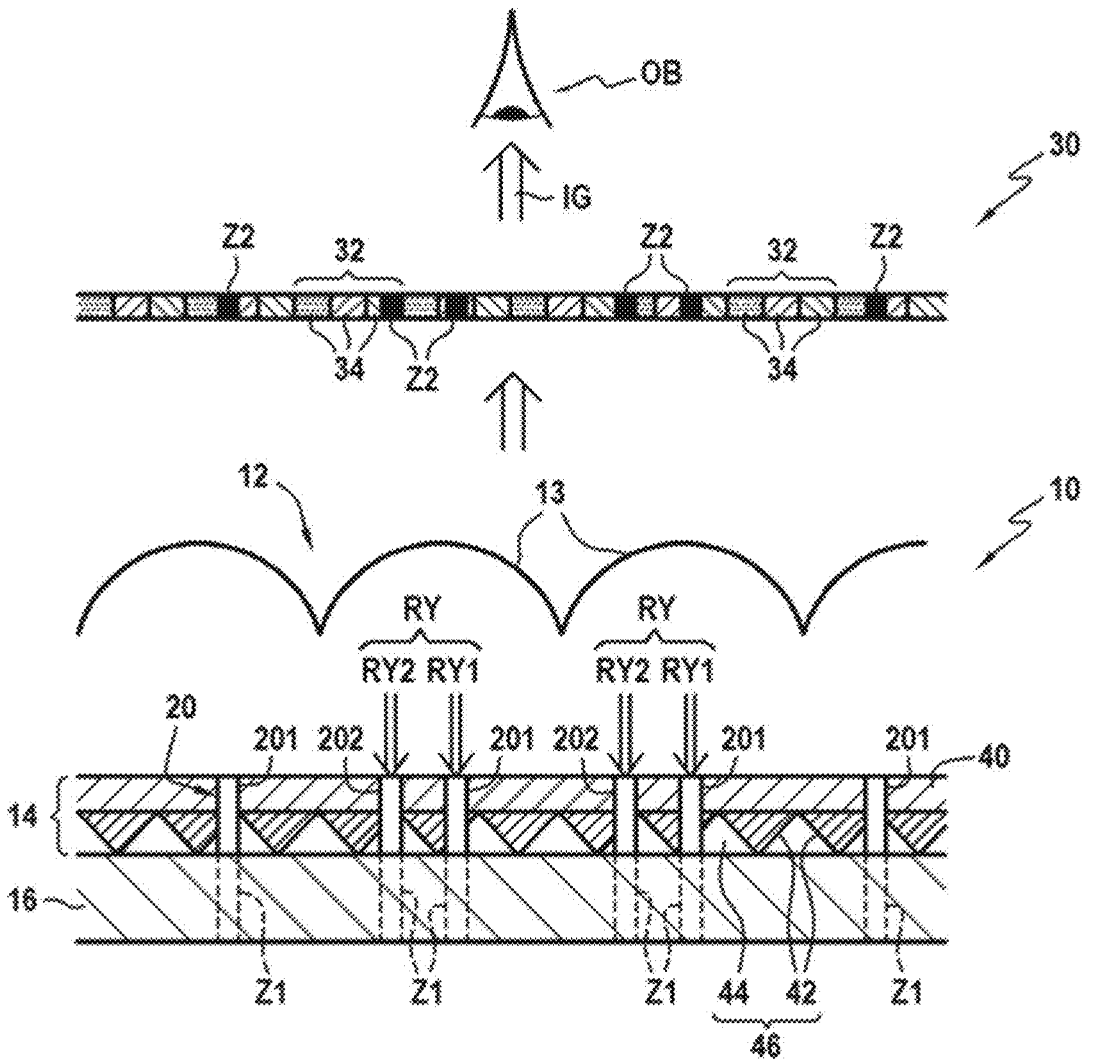
FIG. 7 is a sectional view schematically showing a multilayer structure according to one particular embodiment of the invention.

More specifically, as shown in FIG. 7, it will be considered that the metal layer 14 is a holographic layer comprising a holographic structure 46 that forms an arrangement 30 of pixels 32. Each of these pixels 32 comprises a plurality of sub-pixels 34 of different colors. It will therefore be considered here that the personalized images IG are color images, although the concept of the invention may be applied analogously to form personalized grayscale images IG.

The arrangement 30 of pixels may have various configurations depending on the use case, as described in more detail below. The pixels 32 may for example be arranged in a matrix forming rows and columns of sub-pixels 34 (in an orthogonal matrix for example).

In the exemplary embodiment under consideration here, each pixel 32 of the arrangement 30 is configured such that each sub-pixel 34 has a unique color in said pixel, although other exemplary implementations are possible.

In general, the holographic structure 46 intrinsically forms an arrangement 30 of pixels that is blank, in the sense that the pixels 32 do not comprise the information defining the design of the one or more color images IG that it is desired to form. As described below, combining this arrangement 30 of pixels with dark or bright areas Z2 (FIG. 7) reveals a design of one or more personalized color images IG.

The holographic structure 46 is now described in detail below according to one particular embodiment.

The holographic structure 46 produces the arrangement 30 of pixels 32 in the form of a hologram by diffraction (and possibly also by refraction and/or reflection) of incident light. Although the principle of holograms is well known to those skilled in the art, some elements are recalled below for reference. Some exemplary embodiments of holographic structures are described for example in document EP 2 567 270 B1.

As shown in FIG. 7, the holographic layer 14 in this example comprises a layer (or sub-layer) along with reliefs (or relief-shaped structures) 42, containing three-dimensional information, which are formed from the layer 40 serving as a support. These reliefs 42 form projecting portions (also called “mountains”) separated by depressions (also called “valleys”).

The holographic layer 14 furthermore comprises a layer (or sub-layer) 44, called “high-refractive-index layer”, which has a refractive index n2 greater than the refractive index n1 of the reliefs 42 (it is assumed here that the reliefs 42 form an integral part of the layer 40 serving as a support, and so the reliefs 42 and the layer 40 have the same refractive index n1). It is considered here that the high-refractive-index layer 44 is a metal layer covering the reliefs 42 of the holographic layer 14. As understood by those skilled in the art, the reliefs 42 form, in combination with the layer 44, a holographic structure 46 that produces a hologram (a holographic effect).

The reliefs 42 of the holographic structure 46 may be formed for example by embossing a layer of stamping varnish (included in the layer 40 in this example) in a known way to produce diffractive structures. The stamped surface of the reliefs 42 thus has the shape of a periodic array. By way of example, the depth of this array may be of the order of around ten nanometers and the period of the array may be of the order of around one hundred nanometers. This stamped surface is coated with the metal layer 44, for example by way of vacuum deposition of a metal material. The holographic effect results from the combination of the reliefs 42 and the layer 44 forming the holographic structure 46.

The holographic layer 14 may possibly comprise other sub-layers (not shown) necessary for maintaining the optical characteristics of the hologram and/or making it possible to ensure mechanical and chemical resistance of the assembly.

The high-refractive-index metal layer 44 (FIG. 7) may comprise at least one of the following materials: aluminum, silver, copper, zinc sulfide, titanium oxide, etc.

In the exemplary embodiments described in this document, the holographic layer 14 is transparent, such that the holographic effect producing the arrangement 30 of pixels 32 is visible by diffraction, reflection and refraction.

The holographic structure 14 is produced using any appropriate method known to those skilled in the art.

The reliefs 42 have a refractive index denoted n1, of the order for example of 1.56 at a wavelength $\lambda$=656 nm.

In the example under consideration here (FIG. 7), the layer 40 is a transparent varnish layer. The holographic structure 46 may be coated with a thin layer 44, for example made of aluminum or zinc sulfide, having a high refractive index n2 (compared to n1). The thin layer 44 has for example a thickness of between 30 and 200 nm.

The layer 40 may be a thermoformable layer, thus allowing the reliefs 42 of the holographic structure 46 to be formed by embossing on the layer 40 serving as a support. As a variant, the reliefs 42 of the holographic structure 46 may be produced using an ultraviolet (UV) crosslinking technique. Since these manufacturing techniques are known to those skilled in the art, they are not described in more detail for the sake of simplicity.

Moreover, as shown in FIG. 7, the perforations 20 locally reveal, in one or more personalized images IG, through the holographic structure 46 (and the holographic layer 14), areas Z2 of color shade or grayscale shade caused by the underlying regions Z1 of the support layer 16 that are located facing the perforations 20. These areas Z2 of color shade or grayscale shade constitute areas visible to an observer OB in the one or more final images IG when they observe the multilayer structure 10 through the lenticular array 12. These areas Z2, which are dark or bright (for example fluorescent) depending on the nature of the support layer 16 that is used, form, in combination with the arrangement 30 of pixels 32, at least one personalized image IG. In other words, the formation of the perforations 20 makes it possible to make visible, through the holographic layer 14, underlying regions Z1 of the support layer 16, thereby leading to corresponding areas Z2 in the sub-pixels 34. The underlying regions Z1 thus modify the colorimetric contribution of the sub-pixels 34 so as to form the one or more personalized images IG.

More particularly, as shown in FIG. 7, the perforations 20 form regions in which the holographic layer 14 is destroyed or removed via the perforation effect of the laser. The perforations 20 are through-perforations that extend through the thickness of the holographic structure 46 (and more generally through the thickness of the holographic layer 14) so as to reveal, at the arrangement 30 of pixels 32, areas Z2 (which are more or less dark or bright) corresponding to the underlying regions Z1 of the support layer 16.

The perforations 20 thus occupy all or some of a plurality of sub-pixels 34 of the holographic structure 46. The more or less opaque or transparent character of the support layer 16 then defines the appearance adopted by the areas Z1 in the perforated parts of the sub-pixels 34.

To this end, the perforations 20 may have various shapes and dimensions that may vary according to the circumstances.

In the example under consideration here, the support layer 16 is opaque (non-reflective) with respect to at least the visible wavelength spectrum. In other words, the support layer 16 absorbs at least the wavelengths in the visible spectrum. It is for example a dark layer (black in color for example). It is considered in the present disclosure that the visible wavelength spectrum is approximately between 400 and 800 nanometers (nm), or more precisely between 380 and 780 nm in a vacuum.

It should be noted that this support layer 16 may, on the other hand, be transparent to other wavelengths, in particular to infrared. In particular, the spectrum of the laser radiation RY is preferably chosen such that it is not absorbed by the support layer 16 during the formation of the perforations 20.

As shown in FIG. 7, the underlying regions Z1 revealed by the perforations 20 therefore make it possible, in this particular case, to create dark areas Z2 in the sub-pixels 34 of the holographic layer 14, so as to personalize an image IG formed by the combination of the arrangement 30 of pixels 32 and the dark areas Z2. An observer OB is thus able to view a personalized image IG in (normal or oblique) observation by reflection. In this particular example, the observer OB is also able to view the two different images IG by adjusting the observation angle with respect to the multilayer structure 10.

According to one particular example, the support layer 16 is such that the black density of said at least one personalized image IG formed in the secure document 2 (FIG. 2) from said support layer 16 in particular is greater than the intrinsic black density of the holographic layer 14 without (independently of) the support layer 16. As is well known to those skilled in the art, black density may be measured using an appropriate measuring device (for example a colorimeter or a spectrometer).

According to one particular example, the opaque support layer 16 comprises an opaque black surface facing the holographic layer 14 and/or comprises black or black opacifying (or dark) pigments in its mass. The opaque support layer 16 may in particular comprise a black ink, or even a material tinted in its mass with black or opacifying (or dark) pigments.

According to one particular embodiment, the support layer 16 is reactive (or sensitive) with respect to at least the UV wavelength spectrum, for example by virtue of printing a fluorescent ink reactive to UV on the support layer 16. Thus, in one particular example, the support layer 16 comprises an ink sensitive to ultraviolet, such that the image is visible when the multilayer structure 10 (and more generally the secure document) is exposed to UV. More particularly, under UV exposure, the perforations 20 locally reveal, through the holographic structure 14, fluorescent areas Z2 in the sub-pixels 34, these fluorescent areas Z2 being caused by underlying regions Z1 of the support layer 16 that are located facing the perforations 20, so as to form a personalized (fluorescent) image IG from the arrangement 30 of pixels 32 in combination with the fluorescent areas Z2 when the multilayer structure 10 (and more particularly the support layer 16) is exposed to UV radiation.

According to one variant, the support layer 16 is transparent with respect to at least the visible wavelength spectrum. In this case, an observer OB is able to view a personalized image IG in (normal or oblique) observation by light transmitted from the back face of the structure 10. The underlying regions Z1 revealed by the perforations 20 therefore make it possible, in this particular case, to create bright (or lightened) areas Z2 in the sub-pixels 34 of the holographic layer 14, so as to personalize one or more images IG formed by the combination of the arrangement 30 of pixels 32 and the bright areas Z2. The bright areas Z2 are brighter areas that make it possible to lighten the corresponding pixels 32 (or sub-pixels 34) in which the bright areas are located.

As already indicated, the observer OB, in this particular case, is also able to view at least two different images IG by adjusting the observation angle of the structure 10, although it is also possible to form just a single personalized image IG by way of the technique of the invention.

More generally, regardless of the nature of the support layer 16 (opaque, transparent or fluorescent), the perforations 20 are arranged so as to select the color (or the grayscale) of the pixels 32 by modifying the colorimetric contribution of the sub-pixels 34 with respect to one another in at least some of the pixels 32 formed by the holographic layer 14, so as to reveal the one or more personalized images IG from the arrangement 30 of pixels in combination with the areas Z2 (which are more or less dark or bright). In other words, the one or more images IG thus created are color or grayscale images resulting from selective modulation of the colorimetric contributions of sub-pixels 34.

In particular, the laser perforation in the holographic layer 14 leads to a local elimination (or deformation) of the geometry of the holographic structure 46, and more particularly of the reliefs 42 and/or of the layer 44 covering said reliefs. These local destructions lead to modification of the behavior of light (that is to say of the reflection, diffraction, transmission and/or refraction of light) in the corresponding pixels and sub-pixels. Locally destroying all or some sub-pixels 34 by perforation and revealing, in their place, dark or bright underlying regions Z1 of the support layer 16 thus generates grayscale levels or color shades in the pixels 32 by modifying the colorimetric contribution of certain sub-pixels 34, with respect to one another, in the visual rendering of the one or more final images IG. Creating the (bright or dark) areas Z2 makes it possible in particular to modulate the passage of light such that, for at least some of the pixels 32, one sub-pixel 34 or more has a colorimetric contribution (or weight) that is increased or decreased compared to that of at least one other sub-pixel 34 neighboring the pixel 32 in question.

In particular, the partial or total selective destruction of one or of a plurality of sub-pixels 34 in at least some of the pixels 32 leads to modification of the holographic effect in the regions in question. The holographic effect is eliminated, or reduced, in the perforated regions of the holographic structure 46, thereby reducing (or even completely eliminating) the relative color contribution of the at least partially perforated sub-pixels 34 compared to at least one other neighboring sub-pixel 34 of the pixels 32 in question. Furthermore, as already indicated, this selective destruction makes it possible to reveal underlying regions Z2, which modifies the colorimetric contribution of the sub-pixels in the one or more personalized images IG.

Figure 8:
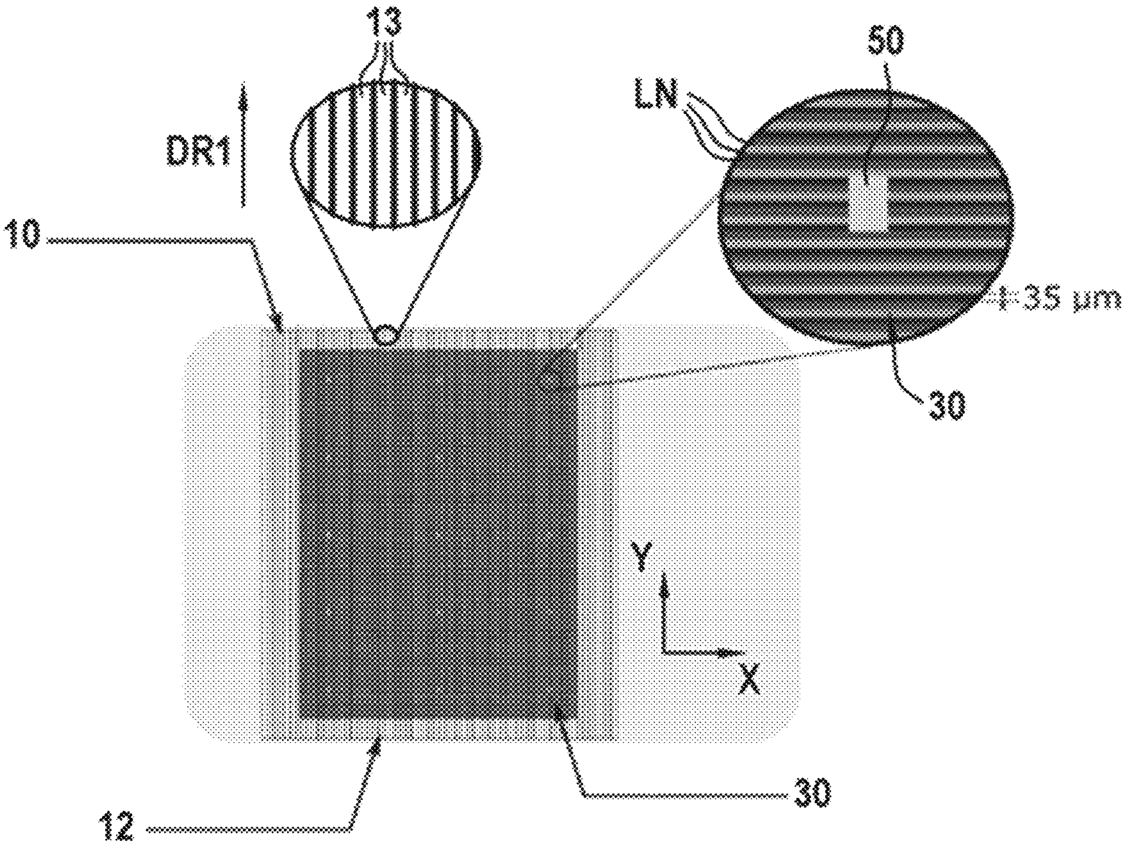
FIG. 8 is a plan view schematically showing a multilayer structure according to one particular embodiment of the invention.

According to one particular example shown in FIGS. 5 and 8, the lenticular array 10 comprises a plurality of cylindrical converging lenses 13 extending in parallel in a first direction DR1. The arrangement 30 of pixels 32 may in particular comprise rows LN of sub-pixels 34 of the same color extending perpendicular to the first direction DR1 of the converging cylindrical lenses 13. Thus, in the example shown in FIG. 8, the arrangement 30 of pixels comprises a series of 3 rows LN of sub-pixels in 3 different respective colors, this series repeating periodically.

In the particular embodiment of FIG. 8, regardless of the angle of incidence θ at which laser radiation RY passes through a cylindrical lens 13 at a given point, this radiation is systematically focused on one and the same row LN of sub-pixels, this row LN being defined by the position of the point of incidence on the cylindrical lens 13 relative to the underlying arrangement 30 of pixels 32. It is thus possible to accurately focus the laser radiation RY in an row LN of a desired color during the personalization phase, thereby making it possible to reduce the problems of registration between the lenses 13 and the arrangement 30 of pixels, and therefore to improve the quality of the one or more final images IG.

According to another particular example, the rows LN of sub-pixels 34 of the same color extend parallel to the first direction DR1 of the converging cylindrical lenses 13 so as to obtain monochrome images with black or gray areas.

Various visual effects may be obtained in the one or more personalized images IG if the rows LN of sub-pixels 34 are parallel to the cylindrical lenses 13 of the lenticular array. Thus, according to a first variant, the period of the lenses 13 corresponds to (or is equal to) the period of the rows LN of sub-pixels, thereby making it possible to obtain a monochrome rendering of an image corresponding to the color of a sub-pixel over a given angle range, and possibly to obtain a sequence of various monochrome images over the aperture angle range of the lenses 14.

According to a second variant in which the rows LN of sub-pixels 34 are parallel to the cylindrical lenses 13, a Moiré effect may be obtained in the one or more personalized images IG by setting the pitch of the lenses 13 such that it is close to (but different from) that of the pixels 32.

According to a third variant in which the rows LN of sub-pixels 34 are parallel to the cylindrical lenses 13, it is possible to obtain one or more personalized grayscale images IG by setting the pitch of the lenses 13 such that it is very large compared to the pitch of the pixels 32.

Figure 9:
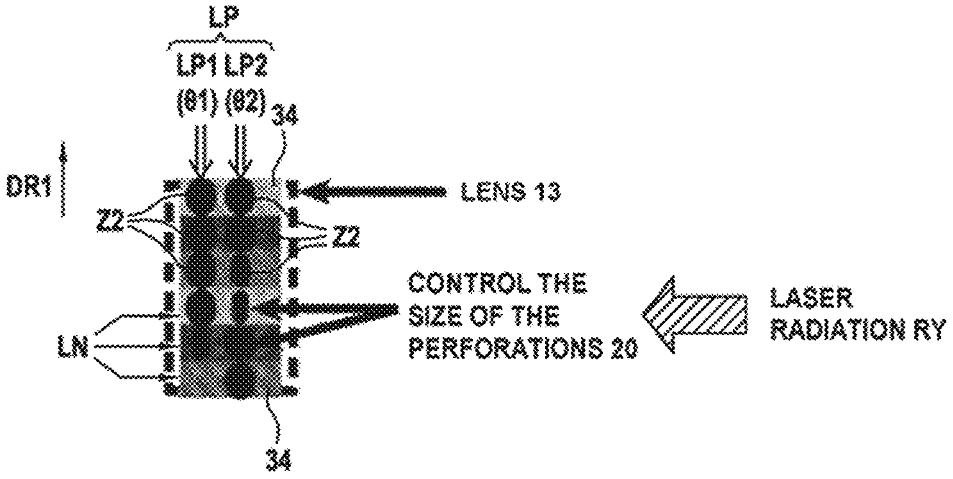
FIG. 9 schematically shows perforations formed in sub-pixels, according to one particular embodiment of the invention.

FIG. 9 schematically shows one example according to which two groups of perforations 20 are formed in the holographic layer 14 by focusing laser radiation RY at two different angles θ1 and θ2 through the lenticular array 12, so as to form two corresponding personalized images IG. By adjusting in particular the power delivered by the laser RY, it is therefore possible to form areas Z2 of color shade or grayscale shade (opaque areas in the present case) of the desired size at particular positions in the arrangement 30 of pixels so as to create two personalized images IG. In the example under consideration here, the larger the opaque areas Z2, the darker the color of the corresponding sub-pixel 34.

As illustrated in FIG. 9, the larger a perforation 20 (the more surface space it occupies), the larger also the opaque area Z2 revealed by this perforation. Furthermore, the larger the opaque area Z2 present in a sub-pixel 34, the more it will influence (modify) the colorimetric contribution of this sub-pixel 34 in the final image IG to which this sub-pixel 34 belongs. Thus, in this particular example, the larger an opaque area Z2, the less room there remains for the color of the corresponding sub-pixel 34 to be expressed, and so the overall color of the sub-pixel 34 in question (and of the corresponding pixel 32) becomes darker. Thus, if a given sub-pixel 34 does not comprise any area Z2 of color shade (or grayscale shade) at a particular observation angle θ through the lenticular array 12, then an observer will see, in this position at the observation angle θ, the original color of the sub-pixel 34. On the other hand, if a given sub-pixel 34 is mainly occupied by an area Z2 at a particular observation angle θ through the lenticular array 12, then an observer will see, in this position at the observation angle θ, essentially the color of the area Z2 under consideration (namely a dark area in the example of FIG. 9). It is thus possible to modulate the color of each sub-pixel 34, and of the corresponding pixels 32, depending on the nature of the support layer 16 and the configuration (position, number, size) of the perforations 20 in this support layer 16.

In the particular example shown in FIG. 9, it is possible in particular to produce perforations of different sizes in one and the same row LN of sub-pixels, by focusing laser radiation RY via one and the same point of a cylindrical lens 13, by modifying the angle of incidence with which the laser radiation RY is projected onto the lens under consideration.

As illustrated in FIG. 9, it is thus possible to form a group of N parallel rows LP of perforations 20 in the holographic layer 14 through each cylindrical lens 13, by focusing laser radiation RY along N different angles of incidence θ (N being an integer at least equal to 2). It is thus possible to form N different personalized images IG that are interleaved with one another such that each image IG is able to be viewed by an observer OB by observing the multilayer structure 10 through the lenticular array 12 at a respective observation angle θ. FIG. 9 shows the particular case where N=2, two rows LP1 and LP2 of perforations 20 being formed by projecting laser radiation RY through the cylindrical lenses 13 at angles of incidence θ1 and θ2, respectively, so as to form two interleaved images IG.

Figure 10A:
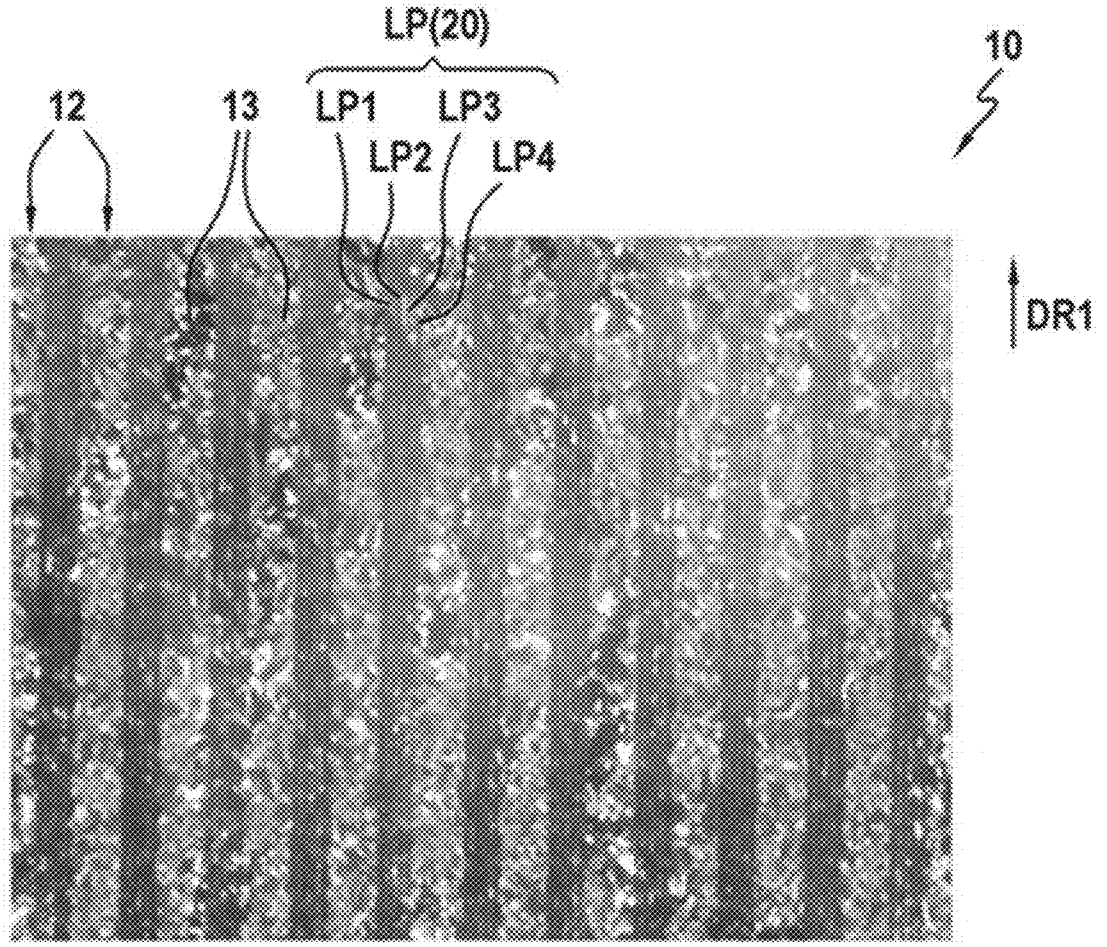
FIG. 10A is a plan view of a multilayer structure according to one particular embodiment of the invention.

FIG. 10A shows another exemplary embodiment in which 4 parallel rows LP (denoted LP1 to LP4) of perforations 20 are formed in the holographic layer 14 through each cylindrical lens 13 so as to form 4 personalized images IG in an interleaved manner (N=4) in the structure 10. As illustrated in the figure, using lenses 13 makes it possible to concentrate the perforations 20 in small regions of the holographic layer 14 (in groups of rows LP, in this example). The perforations 20 are smaller in size, and are concentrated in smaller regions, than if the lenticular array 12 were not present to focus the laser radiation RY during the phase of personalizing the arrangement 30 of pixels. A significant part of the holographic layer 14 may thus be kept free from perforations 20, thereby making it possible to ensure good adhesion of the holographic layer 14 on the support layer 16.

Figure 10B:
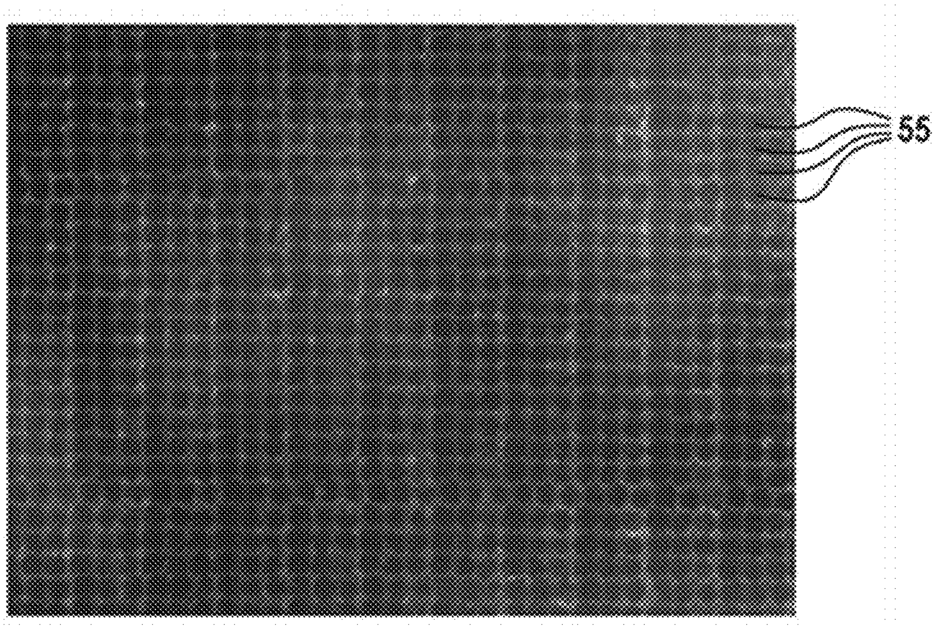
FIG. 10B is a plan view of a multilayer structure without a lenticular array and in which perforations have been created so as to form an image.

By way of comparison, FIG. 10B shows a holographic layer in which perforations have been produced by way of laser radiation in a holographic layer, but without using a lenticular array during the personalization phase, as in the invention. As shown in the figure, a large number of perforations are arranged on the surface of the holographic layer. In the absence of a region without perforations, this holographic layer risks encountering adhesion losses, leading to delaminations in accordance with the phenomenon already described above.

Figure 11:
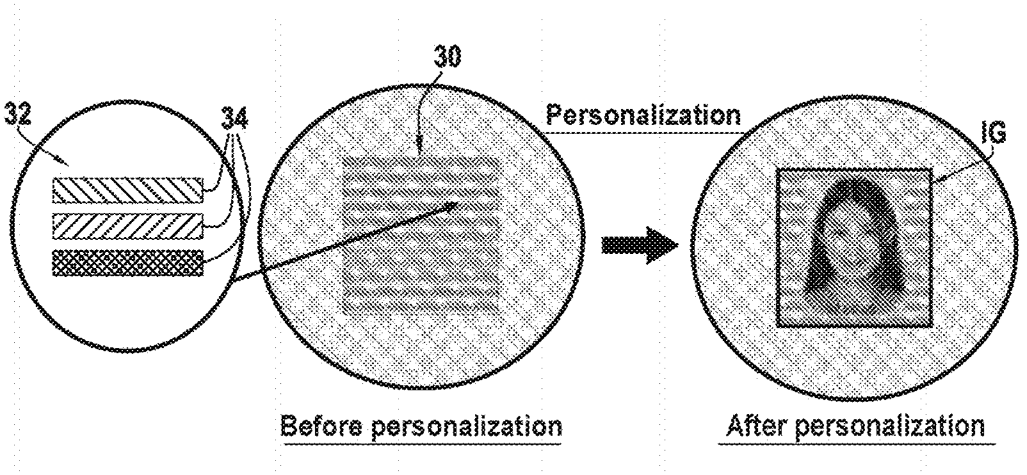
FIG. 11 schematically shows a multilayer structure before personalization and after personalization, according to one particular embodiment of the invention.

FIG. 11 shows, according to one exemplary embodiment of the invention, the arrangement 30 of pixels 32 in the blank state (before personalization), and then the visual rendering of a personalized image IG formed by the combination of the arrangement 30 of pixels 32 and perforations 20 produced by focusing laser radiation RY through the lenticular array 12, as already described above.

In general, the invention advantageously makes it possible to create color or grayscale shades in a metal layer comprising an arrangement of diffractive nanostructures, so as to reveal at least one secure image. As described above, perforations are produced in the metal layer by focusing laser radiation through an array of converging lenses, these perforations making it possible to form areas of more or less dark (or bright) colorimetric shade so as to reveal the design of the one or more desired images. The invention thus makes it possible to form, in the metal layer, a single personalized image or, alternatively, a plurality of images interleaved with each other by projecting laser radiation onto the lenticular array at different angles of incidence.

By using for example an opaque support layer, it is advantageously possible to form dark areas in the metal layer so as to reveal at least one personalized image that is secure and has a good image quality (in particular good contrast). In the same way, it is possible to form at least one good-quality secure image by using a transparent support layer that makes it possible to form bright areas in the metal layer when the final image is viewed in light transmitted through the structure. In this particular case, it is thus possible to form a negative image, the colors or grayscale of which are reversed with respect to an original image.

The lenticular array of the invention makes it possible to focus the laser radiation onto small portions of the metal layer during the phase of personalizing the one or more images. By virtue of the invention, it is possible to retain a significant portion of the metal layer that is without perforations, thereby making it possible to ensure good adhesion of the metal layer to the underlying support layer and therefore to avoid the delamination problems described above. Converging lenses make it possible in particular to limit the size of the perforations created in the metal layer and also to concentrate the perforations in certain regions of the metal layer. As described above, the perforations may for example be created in the form of parallel rows of perforations.

Perforating a metal film under a lens array according to the principle of the invention makes it possible to significantly increase the number of images per angle (and therefore the amount of information) compared for example to a device comprising a laserable layer that is laser-carbonized. In particular, the invention makes it possible to adjust at least one of the following parameters in order to increase the amount of information coded in the image: the engraving thickness (or depth) and the perforation diameter. The engraving thickness in the present invention may thus be much smaller (for example a few tens of nanometers, against typically a few tens of micrometers in the case of a technique of carbonizing a laserable layer), thereby making it possible in particular to personalize the image in an area close to the focal plane of the lenticular array and therefore to obtain better angular resolution. The perforation diameter may also be adjusted in the invention so as to be of the order of magnitude of a nanometer (against around ten micrometers in the case of a technique of carbonizing a laserable layer).

By virtue of the present invention, it is possible in particular to form a very-high-density 2D barcode. The final image thus formed may in particular comprise multiple interleaved barcodes. The coded information density is thus increased compared to a conventional barcode.

It is possible in particular to finely parameterize the size of the perforations so as to produce one or more good-quality personalized images.

As indicated above, the metal layer of the invention may be a holographic layer, although other embodiments are possible. Using a holographic layer makes it possible to obtain an increased image quality, namely better overall luminosity of the final image (more brightness, more vivid colors) and a better color saturation capacity. It is thus possible to form a high-quality color image with an improved colorimetric gamut compared to a printed image, for example.

Using a holographic structure to form the arrangement of pixels is advantageous in that this technique offers high positioning accuracy for the pixels and sub-pixels thus formed. This technique makes it possible in particular to avoid any possible overlapping or misalignment between sub-pixels, thereby improving the overall visual rendering of the image.

The invention makes it possible to produce personalized images that are easily authenticatable and resistant to fraudulent falsification and reproduction. The level of complexity and security of the image that is achieved by virtue of the invention does not come at the expense of the quality of the visual rendering of the image.

The invention also makes it possible to dispense with the use of one or more laserable layers that would require the projection of powerful laser radiation to create color or grayscale shades by carbonization in the final image. The projection of such powerful laser radiation would indeed risk causing structural defects ("blistering" problems) due to heating in the structure during the personalization of the one or more images.

Figure 12:
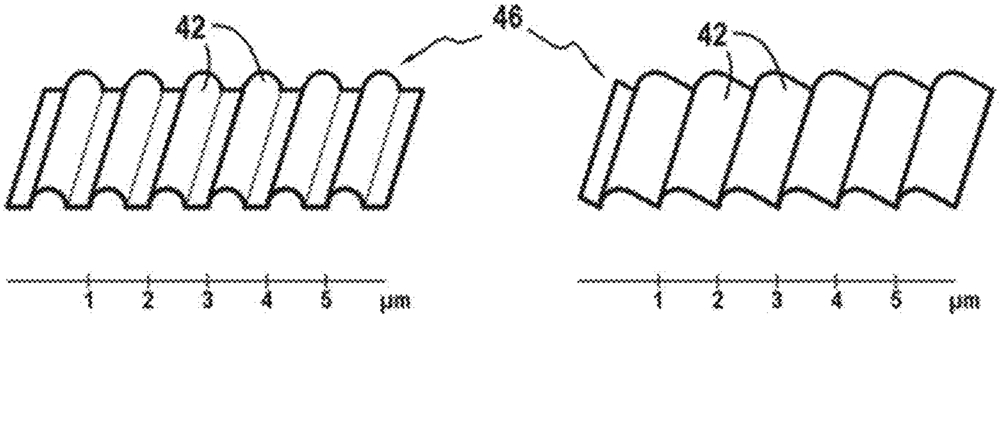
FIG. 12 schematically shows the reliefs of a holographic structure, according to one particular embodiment of the invention.

FIG. 12 shows some examples of reliefs 42 of a holographic structure 46 as shown in the particular example in FIGS. 7-8 and 11. As illustrated, this holographic structure 46 comprises projecting portions and depressions. Various shapes and dimensions of the holographic structure are possible within the scope of the present invention.

Moreover, as already indicated, the holographic layer 46 shown in FIGS. 7-8 and 11 forms an arrangement 30 of pixels 3. Each pixel 30 comprises a plurality of color sub-pixels 34 (or having a grayscale level).

Figure 13:
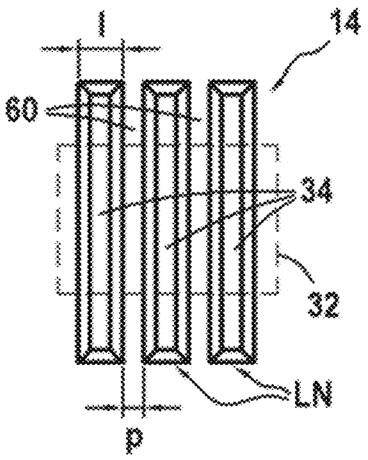
FIGS. 13 and 14 schematically show an arrangement of pixels and sub-pixels, according to one particular embodiment of the invention.
Figure 14:
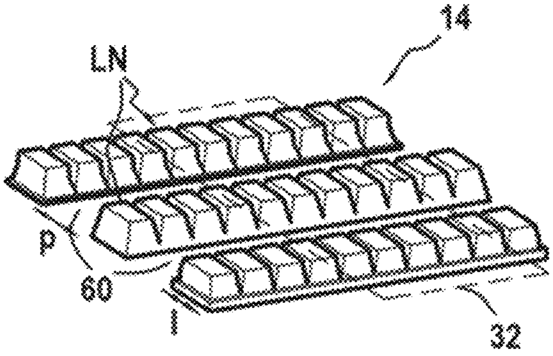

FIGS. 13 and 14 show one particular example according to which each pixel 32 comprises 3 sub-pixels 34. The number, the shape and more generally the configuration of the pixels and sub-pixels may however vary according to the circumstances.

An external observer OB is thus able to view, in a particular observation direction, the arrangement 30 of pixels from light refracted, reflected and/or diffracted from the holographic structure 46 of the holographic layer 14 (FIGS. 7-8).

More precisely, each pixel 32 is formed by a region of the holographic structure 46 present in the holographic layer 14. It is considered here that the reliefs 42 of the holographic structure 46 form parallel rows LN of sub-pixels (as shown in FIG. 8), other implementations however being possible. For each pixel 32, its constituent sub-pixels 34 are thus formed by a portion of a respective row LN, this portion constituting a respective holographic grating (or holographic grating portion) configured to generate a corresponding color of said sub-pixel by diffraction and/or reflection.

In the example envisaged here, the pixels 32 thus comprise 3 sub-pixels 34 of different colors, other examples however being possible. It is assumed that each sub-pixel 34 is monochromatic. Each holographic grating is configured to generate a color in each sub-pixel 34 corresponding to a predetermined observation angle, this color being modified at a different observation angle. It is assumed for example that the sub-pixels 34 of each pixel 32 respectively have a different basic color (for example green/red/blue or cyan/yellow/magenta) at a predetermined observation angle.

As shown in FIGS. 13 and 14, the holographic gratings corresponding to the three rows LN, which form the sub-pixels 34 of one and the same pixel 32, have particular geometric specifications so as to generate a desired different color. In particular, the holographic gratings forming the 3 sub-pixels 34 in this example have a width denoted l and a pitch between each holographic grating denoted p.

Thus, according to another particular example in which each pixel 32 is composed of 4 sub-pixels 34, the maximum theoretical saturation capacity S in one of the colors of the sub-pixels in one and the same pixel may be expressed as follows:

$$S = \frac{25}{100} \times \frac{l}{l + p} \quad \text{[Math. 1]}$$

By way of example, it may be considered that l=60 μm and p=10 μm, this leading to a maximum theoretical saturation capacity S=0.21.

It is possible to form the holographic gratings forming the sub-pixels 34 such that the pitch p tends toward zero, thereby making it possible to increase the maximum theoretical saturation capacity in a color of a sub-pixel (S then tending toward 0.25).

According to one particular example, the pitch is fixed at p=0, thereby making it possible to achieve a maximum theoretical saturation capacity S equal to 0.25. In this case, the rows LN of sub-pixels as shown in FIGS. 13 and 14 are contiguous (no space or white area being present between the rows of sub-pixels).

The invention, according to one particular embodiment, thus makes it possible to form rows of sub-pixels that are contiguous, that is to say adjacent to one another without it being necessary to leave separating white areas between each row, or optionally by keeping separating white areas but of limited size between the rows of sub-pixels (with a small pitch p). This particular configuration of the holographic gratings makes it possible to significantly improve the quality of the final image IG (better color saturation) compared to conventional image-forming techniques that do not use a holographic structure. This is possible in particular because the formation of holographic structures makes it possible to achieve better positioning accuracy of the sub-pixels and better homogeneity than through conventional printing of the sub-pixels (offset printing or the like).

As already indicated, the arrangement 30 of pixels 32 formed by the holographic layer 14 in the structure 10 shown in FIGS. 7-8 and 11 may take various forms. Some exemplary embodiments are described below.

In general, the arrangement 30 of pixels may be configured such that the sub-pixels 34 are distributed uniformly in the holographic layer 14. The sub-pixels 34 may for example form parallel rows LN of sub-pixels or else a hexagonal array (a Bayer array), other examples being possible.

The sub-pixels 34 may for example form an orthogonal matrix.

The pixels 32 may be distributed uniformly in the arrangement 30 such that the same pattern of sub-pixels 34 repeats periodically in the holographic layer 14.

Moreover, each pixel 32 of the arrangement 30 may be configured such that each sub-pixel 34 has a unique color in said pixel under consideration. In one particular example, each pixel 32 in the arrangement 30 of pixels forms an identical pattern of color sub-pixels.

Some specific examples of arrangements (or tiling) 30 of pixels able to be implemented in the secure document 2 (FIG. 2) are now described with reference to FIGS. 15, 16 and 17. It should be noted that these implementations are presented here only by way of non-limiting examples, numerous variants being possible in terms in particular of arrangement and shape of the pixels and sub-pixels, and also the colors assigned to these sub-pixels.

Figure 15:
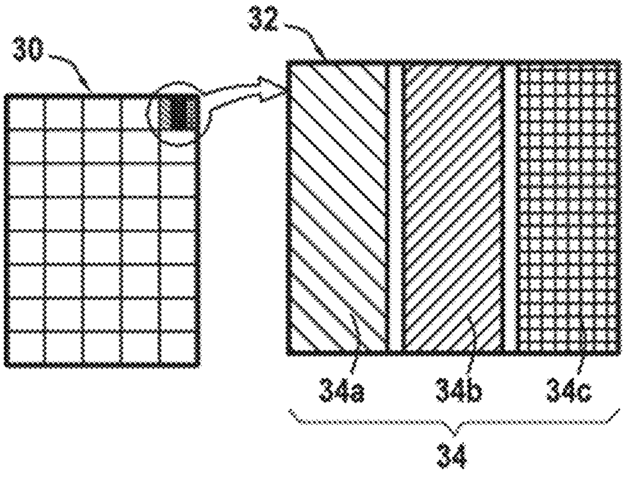
FIGS. 15, 16 and 17 schematically show arrangements of pixels and sub-pixels, according to some particular embodiments of the invention.

According to a first example shown in FIG. 15, the pixels 32 of the arrangement 30 of pixels are rectangular (or square) in shape and comprise 3 sub-pixels 34*a*, 34*b* and 34*c* (collectively denoted 34) of different colors. As already described with reference to FIGS. 13-14, the sub-pixels 34 may each be formed by a portion of a row LN of sub-pixels. In this example, the tiling thus forms a matrix of rows and columns of pixels 32, which are orthogonal to one another.

Figure 16:
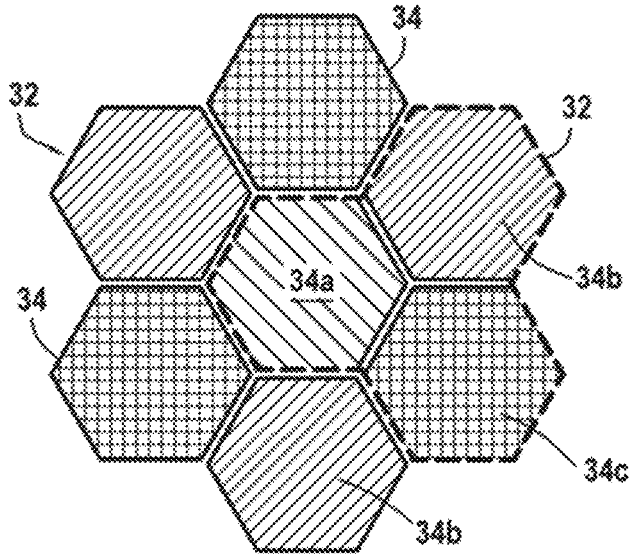

FIG. 16 is a plan view showing another example of regular tiling in which each pixel 32 is composed of 3 sub-pixels 34, denoted 34*a* to 34*c*, each of a different color. The sub-pixels 34 are hexagonal in shape here.

Figure 17:
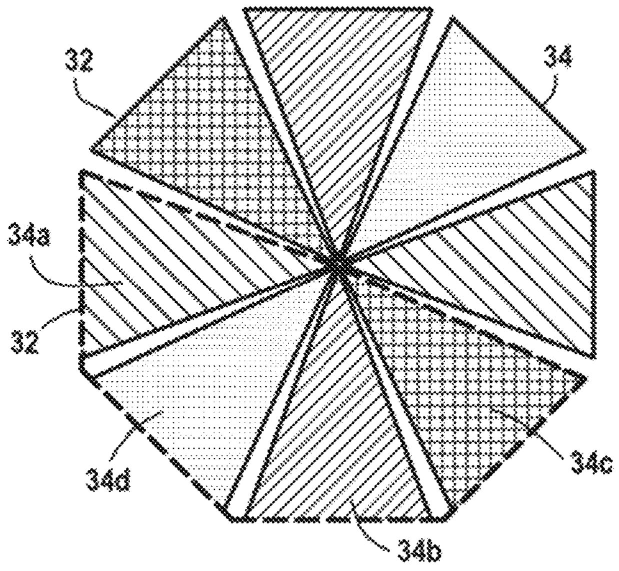

FIG. 17 is a plan view showing another example of regular tiling in which each pixel 32 is composed of 4 sub-pixels 34, denoted 34*a* to 34*d*, each of a different color. The sub-pixels 34 are triangular in shape here.

For each of the arrangements of pixels under consideration, it is possible to adapt the shape and the dimensions of each pixel 32 and also the dimensions of the separating white areas that are present, where applicable, between the sub-pixels, so as to achieve the desired maximum color saturation level and the desired luminosity level.

Moreover, the present invention also targets a manufacturing method for manufacturing at least one personalized image IG according to any one of the embodiments described above.

Therefore, the various variants and technical advantages described above with reference to the multilayer structures 10, and more generally to a secure document 2 according to the concept of the invention, apply analogously to the manufacturing method of the invention for obtaining such a structure or such a document.

Figure 18:
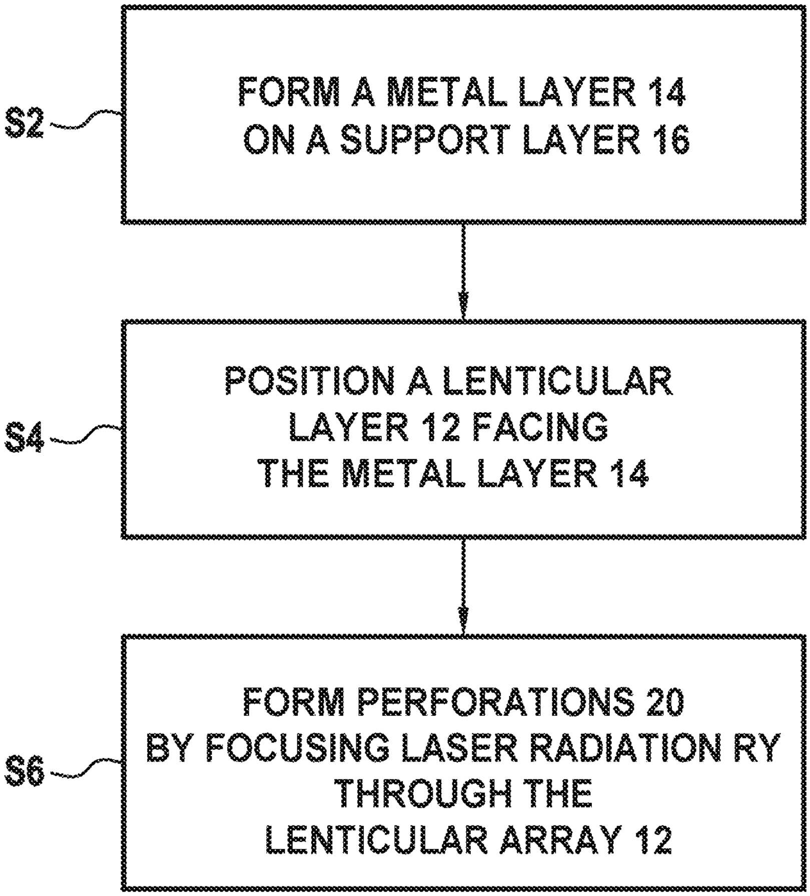
FIG. 18 schematically shows a manufacturing method according to one particular embodiment of the invention.

A method for manufacturing a color image IG as described above is now described with reference to FIG. 18, according to one particular embodiment. It is assumed for example that at least one color image IG is formed in a document 2, as illustrated in FIG. 2.

In a formation step S2, a metal layer 14 is formed on a support layer 16. The metal layer 14 and the support layer 16 are as already described in the embodiments above. In particular, the metal layer 14 comprises an arrangement of diffractive nanostructures. As already indicated, this diffractive arrangement is configured to diffract light at least in the visible wavelength spectrum. These diffractive nanostructures may be arranged periodically (so as to form for example a diffractive holographic structure) or aperiodically (non-periodically) so as to control (or modify) the colorimetry of the reflected light as a function of the angle of incidence of the light on the metal layer 14, as already described above. In addition, the support layer 16 may be opaque with respect to at least the visible wavelength spectrum or transparent with respect to at least the visible wavelength spectrum, depending on the visual effect that it is desired to create in one or more personalized images IG.

An adhesive layer and/or a layer of glue (not shown) may be used to adhesively bond the metal layer 14 to the support layer 16.

In a positioning step S4, a lenticular array 12 as already described in the embodiments above is positioned (or formed) facing the metal layer 14. In this example, the lenticular array 12 is formed directly on the metal layer 14, although other implementations are possible, or at least one intermediate layer is present between the lenticular array 12 and the metal layer 14.

As already described, the lenticular array 12 comprises converging lenses 13 positioned facing (above) the metal layer 12, the latter thus being interposed between the lenticular array 12 and the support layer 16.

In a formation step S6, perforations (or holes) 20, as already described in the embodiments above, are formed in the holographic layer 22 by focusing laser radiation RY through the lenticular array 12 onto the metal layer 14. These perforations 20 thus comprise at least one group of perforations 20 produced by focusing laser radiation RY at a respective angle of incidence θ so as to reveal a corresponding personalized image IG when the secure document 2 (or the structure 10) is observed at said angle of incidence θ.

Groups of perforations 20 may thus be produced by focusing laser radiation RY through the lenticular array 12 at different angles of incidence θ. In this case, each group of perforations represents a personalized image IG able to be viewed by an observer at a corresponding observation angle θ. The various images IG are thus formed by interleaved perforation in the metal layer 12.

As described above in the exemplary embodiment of FIGS. 7-8, the perforations 20 are produced so as to occupy all or some of a plurality of sub-pixels 34 of the holographic layer 14. These perforations 20 locally reveal, through the holographic structure 46, dark or bright areas Z2 in the sub-pixels 34, these areas Z2 being caused (or produced) by underlying regions Z1 of the support layer 16 that are located facing the perforations 20. To this end, the perforations 20 here are through-perforations that extend through the thickness of the holographic structure 46 (and more generally through the thickness of the holographic layer 14) so as to reveal underlying regions Z2 of the support layer 16 at the arrangement 30 of pixels 32. In other words, the underlying regions 34 modify the contribution of the sub-pixels 34 so as to form the final image IG. It is thus possible to form one or more personalized images IG from the arrangement 30 of pixels in combination with said dark or bright areas Z2.

Once step S6 is complete, this thus gives a multilayer structure 10 as described above according to various embodiments.

In the particular case where the metal layer 12 is a holographic layer, as already described with reference in particular to FIGS. 7-8, the formation S2 of the metal layer 14 may comprise the provision of a sub-layer of varnish 40 forming the reliefs 42 of a holographic grating; and the formation of a metal sub-layer 44 on the reliefs 42 of the sub-layer of varnish 40, the metal sub-layer 44 having a refractive index greater than that of the sub-layer of varnish. The holographic layer 14 is then positioned on the support layer 16.

The layer 40 (FIG. 7) of the holographic layer 14 may for example be a thermoformable layer, thus allowing the reliefs 42 of the holographic structure 46 to be formed by embossing on the layer 40 serving as a support. As a variant, the reliefs 42 of the holographic structure 46 may be produced using a UV crosslinking technique. Since these manufacturing techniques are known to those skilled in the art, they are not described in more detail for the sake of simplicity.

Those skilled in the art will understand that the embodiments and variants described above are merely non-limiting exemplary implementations of the invention. In particular, those skilled in the art will be able to envisage any adaptation or combination of the embodiments and variants described above, in order to meet a particular need according to the claims presented below.

The invention claimed is:

1. A secure document comprising:

a metal layer having an arrangement of diffractive nanostructures, the diffractive nanostructures being arranged periodically in the metal layer to form a diffractive holographic structure;

a lenticular array having converging lenses positioned facing the metal layer; and a support layer on which the metal layer is arranged such that said metal layer is interposed between the lenticular array and the support layer, wherein the metal layer includes perforations formed by focusing laser radiation through the lenticular array onto the metal layer, the perforations including at least one group of perforations produced by focusing the laser radiation at a respective angle of incidence to reveal a corresponding personalized image when the secure document is observed at said angle of incidence, and wherein the metal layer includes a holographic structure forming an arrangement of pixels each including a plurality of sub-pixels of different colors, the perforations locally revealing, through the holographic structure, color or grayscale shades caused by underlying regions of the support layer that are located facing the perforations, the underlying regions modifying a colorimetric contribution of the sub-pixels.

2. The secure document as claimed in claim 1, wherein the lenticular array includes a plurality of cylindrical converging lenses extending in parallel in a first direction.

3. The secure document as claimed in claim 1, wherein each pixel of said arrangement of pixels is configured such that each sub-pixel has a unique color in said pixel.

4. The secure document as claimed in claim 1, wherein the support layer is opaque with respect to at least the visible wavelength spectrum, and wherein the perforations locally reveal, through the holographic structure, dark areas in the sub-pixels caused by underlying regions of the support layer that are located facing the perforations to form a personalized image from the arrangement of pixels in combination with the dark areas.

5. The secure document as claimed in claim 1, wherein the support layer includes an ink sensitive to ultraviolet, such that the image is visible when the secure document is exposed to ultraviolet.

6. The secure document as claimed in claim 1, wherein the support layer is transparent with respect to at least the visible wavelength spectrum, and wherein the perforations locally reveal, through the holographic structure, bright areas in the sub-pixels when incident light in the visible spectrum is projected through the perforations to form a personalized image from the arrangement of pixels in combination with the bright areas.

7. The secure document as claimed in claim 1, wherein the lenticular array includes a plurality of cylindrical converging lenses extending in parallel in a first direction, and wherein the arrangement of pixels includes rows of sub-pixels of the same color extending perpendicular to the first direction of the converging cylindrical lenses.

8. The secure document as claimed in claim 1, wherein the lenticular array includes a plurality of semi-spherical or aspherical converging lenses.

9. The secure document as claimed in claim 1, wherein the perforations include a plurality of groups of perforations, each group of perforations being produced by focusing the laser radiation at a different angle of incidence to reveal interleaved personalized images that are observable at various angles of incidence.

10. The secure document as claimed in claim 1, wherein the metal layer is positioned approximately in a focal plane of the lenticular array.

11. A method for manufacturing a secure document, comprising:

forming, on a support layer, a metal layer having an arrangement of diffractive nanostructures, the diffractive nanostructures being arranged periodically in the metal layer to form a diffractive holographic structure;

positioning a lenticular layer, including converging lenses, facing the metal layer, the metal layer being interposed between a lenticular array and the support layer; and forming perforations by focusing laser radiation through the lenticular array onto the metal layer, the perforations including at least one group of perforations produced by focusing the laser radiation at a respective angle of incidence as to reveal a corresponding personalized image when the secure document is observed at said angle of incidence, wherein the metal layer includes a holographic structure forming an arrangement of pixels each including a plurality of sub-pixels of different colors, the perforations locally revealing, through the holographic structure, color or grayscale shades caused by underlying regions of the support layer that are located facing the perforations, the underlying regions modifying a colorimetric contribution of the sub-pixels.

12. The secure document as claimed in claim 2, wherein each pixel of said arrangement of pixels is configured such that each sub-pixel has a unique color in said pixel.

13. The secure document as claimed in claim 2, wherein the support layer is opaque with respect to at least the visible wavelength spectrum, and wherein the perforations locally reveal, through the holographic structure, dark areas in the sub-pixels caused by underlying regions of the support layer that are located facing the perforations to form a personalized image from the arrangement of pixels in combination with the dark areas.

14. The secure document as claimed in claim 3, wherein the support layer is opaque with respect to at least the visible wavelength spectrum, and wherein the perforations locally reveal, through the holographic structure, dark areas in the sub-pixels caused by underlying regions of the support layer that are located facing the perforations to form a personalized image from the arrangement of pixels in combination with the dark areas.

15. The secure document as claimed in claim 2, wherein the support layer includes an ink sensitive to ultraviolet, such that the image is visible when the secure document is exposed to ultraviolet.

16. The secure document as claimed in claim 3, wherein the support layer includes an ink sensitive to ultraviolet, such that the image is visible when the secure document is exposed to ultraviolet.

17. The secure document as claimed in claim 2, wherein the support layer is transparent with respect to at least the visible wavelength spectrum, and wherein the perforations locally reveal, through the holographic structure, bright areas in the sub-pixels when incident light in the visible spectrum is projected through the perforations to form a personalized image from the arrangement of pixels in combination with the bright areas.

18. The secure document as claimed in claim 3, wherein the support layer is transparent with respect to at least the visible wavelength spectrum, and wherein the perforations locally reveal, through the holographic structure, bright areas in the sub-pixels when incident light in the visible spectrum is projected through the perforations to form a personalized image from the arrangement of pixels in combination with the bright areas.

19. The secure document as claimed in claim 2, wherein the lenticular array includes a plurality of cylindrical converging lenses extending in parallel in a first direction, and wherein the arrangement of pixels includes rows of sub-pixels of the same color extending perpendicular to the first direction of the converging cylindrical lenses.

20. The secure document as claimed in claim 3, wherein the lenticular array includes a plurality of cylindrical converging lenses extending in parallel in a first direction, and wherein the arrangement of pixels includes rows of sub-pixels of the same color extending perpendicular to the first direction of the converging cylindrical lenses.

* * * * *